United States Patent
Busch et al.

(10) Patent No.: US 9,138,843 B2
(45) Date of Patent: Sep. 22, 2015

(54) HANDLING WORKPIECES AT A WORKPIECE SUPPORT

(71) Applicant: TRUMPF Sachsen GmbH

(72) Inventors: Marcus Busch, Dresden (DE); Philipp Drechsler, Neukirch (DE)

(73) Assignee: TRUMPF Sachsen GmbH, Neukirch (DE)

( * ) Notice: Subject to any disclaimer, the term of this patent is extended or adjusted under 35 U.S.C. 154(b) by 0 days.

(21) Appl. No.: 14/446,538

(22) Filed: Jul. 30, 2014

(65) Prior Publication Data

US 2015/0034453 A1 Feb. 5, 2015

(30) Foreign Application Priority Data

Jul. 30, 2013 (DE) .......................... 10 2013 214 844

(51) Int. Cl.
| | | |
|---|---|---|
| *B23Q 7/04* | (2006.01) | |
| *B23Q 7/00* | (2006.01) | |
| *B21D 43/00* | (2006.01) | |
| *B23Q 5/22* | (2006.01) | |
| *B21D 43/02* | (2006.01) | |

(52) U.S. Cl.
CPC *B23Q 7/00* (2013.01); *B21D 43/00* (2013.01); *B21D 43/02* (2013.01); *B23Q 5/22* (2013.01); *B23Q 7/046* (2013.01)

(58) Field of Classification Search
CPC ....................................................... B23Q 7/046
See application file for complete search history.

(56) References Cited

U.S. PATENT DOCUMENTS

| | | | | |
|---|---|---|---|---|
| 4,587,716 | A * | 5/1986 | Bytow | 483/14 |
| 5,193,426 | A * | 3/1993 | Dunn | 83/277 |
| 5,735,219 | A * | 4/1998 | Kirker et al. | 108/54.1 |
| 5,782,129 | A | 7/1998 | Vanderzee et al. | |
| 6,430,796 | B1 * | 8/2002 | Jones et al. | 29/243.53 |
| 8,074,975 | B2 * | 12/2011 | Poike et al. | 269/60 |
| 2003/0147729 | A1 * | 8/2003 | Leibinger et al. | 414/222.01 |
| 2004/0130085 | A1 | 7/2004 | Lim | |
| 2010/0133405 | A1 | 6/2010 | Jeon | |
| 2012/0007297 | A1 * | 1/2012 | Breitling et al. | 269/14 |
| 2012/0100974 | A1 * | 4/2012 | Busch | 483/1 |
| 2013/0236277 | A1 * | 9/2013 | Bytow et al. | 414/222.08 |
| 2013/0298739 | A1 * | 11/2013 | Bauch et al. | 83/27 |
| 2014/0290453 | A1 * | 10/2014 | Buettner et al. | 83/27 |

FOREIGN PATENT DOCUMENTS

| | | |
|---|---|---|
| EP | 1967301 A1 | 9/2008 |
| WO | WO2012089859 A1 | 7/2012 |

* cited by examiner

*Primary Examiner* — Gene Crawford
*Assistant Examiner* — Thomas Randazzo
(74) *Attorney, Agent, or Firm* — Fish & Richardson P.C.

(57) ABSTRACT

A device for handling workpieces at a workpiece support defining a workpiece support plane includes a bearing structure extending with a main plane of the bearing structure parallel to the workpiece support plane. The bearing structure has bearing structure segments arranged next to one another parallel to the main plane, and the bearing structure segments define a planar extent of the bearing structure in the main plane. The device includes a guide device for the bearing structure segments, and the bearing structure segments are guided on the guide device such that the bearing structure segments can be positioned parallel to the main plane of the bearing structure. The device also includes retaining elements provided with the bearing structure segments, and the retaining elements are configured to be positioned on a workpiece and to be handled to fix the workpiece.

18 Claims, 8 Drawing Sheets

HANDLING WORKPIECES AT A WORKPIECE SUPPORT

CROSS REFERENCE TO RELATED APPLICATION

This application claims priority under 35 U.S.C. §119 to German Application No. DE 10 2013 214 844.5 filed on Jul. 30, 2013. The content of this priority application is hereby incorporated by reference in its entirety.

TECHNICAL FIELD

The specification relates to methods, devices and systems for handling workpieces at a workpiece support.

BACKGROUND

When machining or otherwise processing plate-shaped workpieces, a handling device can be used to feed unmachined raw workpieces for processing and/or to remove workpieces produced as processed products. An example of such a handling device may be found in EP 1 967 301 A1, which describes a handling device with a sucker frame that can be raised and lowered and can also be moved in a horizontal direction. Provided on the sucker frame are a total of four removal bars which, on the workpiece side, are provided with suckers for fixing the products that are to be handled. The removal bars form bearing structure segments of a bearing structure composed of the removal bars. The planar extent of the bearing structure is variable. For this purpose, two of the removal bars can be jointly positioned linearly relative to the two other removal bars by a controlled motor drive. This positioning option is used to adapt the bearing structure, formed by the removal bars, and thereby particularly also the configuration of the suction field, consisting of the suckers of the removal bars, of the bearing structure, to different conditions of use.

SUMMARY

One aspect of the invention features a device for handling workpieces at a workpiece support defining a workpiece support plane. The device includes a bearing structure which extends with its main plane parallel to the workpiece support plane and has bearing structure segments which, for their part, are arranged next to one another parallel to the main plane of the bearing structure and define a planar extent of the bearing structure in the main plane thereof. A guide device is provided for the bearing structure segments and on which bearing structure segments are guided such that they can be positioned parallel to the main plane of the bearing structure. The device also includes retaining elements that can be positioned to fix the workpieces.

Bearing structure segments, provided with retaining elements, form at least two segment arrangements which can be positioned relative to one another, controlled by a motor, on the guide device while changing the planar extent of the bearing structure along a first axis which spans the main plane of the bearing structure, and of which segment arrangements at least one is configured as a multi-segment arrangement having at least two bearing structure segments which, for their part, are arranged next to one another along a second axis spanning the main plane of the bearing structure and extending perpendicularly to the first axis of the main plane of the bearing structure.

The bearing structure segments provided with the retaining elements can be positioned relative to one another in both axial directions of a main plane of the bearing structure by controlled motor drives. As a result, a retaining element field, formed by the retaining elements of the bearing structure segments, can be configured in an automated and highly diverse manner. By appropriately adjusting the positions assumed by the bearing structure segments and the retaining elements provided thereon relative to one another in both axial directions of the main plane of the bearing structure, the retaining element field can be adapted in particular to any geometry of the workpieces to be handled. If suckers are provided as retaining elements, it is also possible to avoid a situation in which suckers can come to rest on the workpiece to be handled in a perforated region and then the necessary retaining force cannot build up.

A change of the planar extent of the bearing structure accompanies a change of the configuration of the retaining element field formed by the retaining elements of the bearing structure segments. Consequently, the bearing structure can be adapted both to the size of the workpieces to be handled and to the spatial conditions in the place of use thereof. For example, for use in the spatially confined region of a machining system used for machining workpieces, for example for use in the immediate vicinity of a die cutting head or a laser cutting head of a machine tool, the bearing structure segments can closely approach one another in both axial directions of the main plane of the bearing structure. Consequently, a small-area bearing structure is produced which can operate without collision in the immediate vicinity of the machining system and is able, for example, to pick up workpieces directly at the machining system after machining At the same time, it is possible to configure the bearing structure on a large scale where a correspondingly large amount of space is available by appropriately positioning the bearing structure segments. A large bearing structure is particularly capable of handling correspondingly large workpieces.

All conventional types of retaining elements are possible as retaining elements. Suckers are preferred, but in addition or alternatively, holding magnets for example can also be used.

In some implementations, each movable bearing structure segment and also each direction of movement of the movable bearing structure segment can be provided with an individual drive. In some implementations, the device includes a common arrangement positioning drive for a plurality of segment arrangements and/or a common segment positioning drive for a plurality of bearing structure segments. The use of a single drive for a plurality of units to be moved can minimize costs of the entire arrangement as well as the mass and structural dimensions thereof. In particular, electric or pneumatic drives, but also linear motors for example are possible as types of drive. Particular advantages of linear drives are the relatively small dimensions and high positioning accuracy thereof.

In some cases, the common arrangement positioning drive and/or the common segment positioning drive is connected in terms of drive by a toothed gearing to the segment arrangements positionable relative to one another or to the bearing structure segments positionable relative to one another. Toothed gearings having a rack and a driving pinion, meshing therewith, are particularly distinguished by a high rigidity and compact construction. Using toothed gearings may realize relatively high speed movements.

A particularly compact construction of the handling device can be realized with a particularly low level of technical complexity. In particular, a segment positioning drive common to a plurality of bearing structure segments may be provided with a single drive motor that drives a drive shaft, extending along the first axis of the main plane of the bearing structure, about the geometric shaft axis. Sitting on the common drive shaft is a plurality of driving pinions each mounted rotatably on a multi-segment arrangement. Each of the driving pinions meshes with at least two racks, each of which is connected to a bearing structure segment of the relevant multi-segment arrangement. When the drive shaft, driven by the common drive motor, rotates, the gear pinions, sitting on the drive shaft, move via the racks, which are each engaged with the driving pinions, of a plurality of bearing structure segments of the respective multi-segment arrangement along the second axis of the main plane of the bearing structure. In this way, bearing structure segments of a plurality of multi-segment arrangements can be positioned relative to one another along the second axis of the main plane of the bearing structure by a single drive motor and a single drive shaft. The individual multi-segment arrangements can nevertheless be positioned relative to one another along the first axis of the main plane of the bearing structure, the driving pinions, mounted rotatably on the multi-segment arrangements, can be positioned relative to one another, controlled by a motor, along the common drive shaft. The same applies to the racks with which the driving pinions respectively engage.

In a preferred configuration, the combination of a longitudinally displaceable and non-rotatable mounting of the driving pinions on the common drive shaft is realized by using as the common drive shaft a drive shaft with a polygonal cross section which engages in a hub with a corresponding cross-sectional shape on the driving pinions sitting on the drive shaft. The positioning movements of the driving pinions or the positioning movements of the multi-segment arrangements mounting the driving pinions along the first axis of the main plane of the bearing structure may be produced in particular by compact linear drives.

In some examples, one segment arrangement of the segment arrangements of the bearing structure, which are positionable relative to one another in a motor-controlled manner along the first axis of the main plane of the bearing structure, is stationary in the direction of movement. An unchangeable positioning of this type of a segment arrangement along the first axis of the main plane of the bearing structure is particularly acceptable in cases in which the relevant segment arrangement is arranged in respect of a workpiece or a workpiece support, irrespective of the specific handling task, with a uniform spatial allocation. The stationary positioning of a segment arrangement advantageously makes it possible to dispense with a motor drive which would otherwise have to be provided for this segment arrangement.

A bearing structure segment of the bearing structure segments of at least one multi-segment arrangement, which bearing structure segments are positionable relative to one another in a motor-controlled manner along the second axis of the main plane of the bearing structure, may be stationary in the direction of movement.

In some implementations, at least one multi-segment arrangement includes an odd number of bearing structure segments. A middle bearing structure segment is provided as the bearing structure segment that is stationary along the second axis of the main plane of the bearing structure. In some cases, in a symmetrical load distribution, the relevant multi-segment arrangement is mounted with the middle stationary bearing structure segment in the centre of the associated guide device of the handling device.

In some cases, in a symmetrical load distribution, at least one multi-segment arrangement has a centre of movement for the associated bearing structure segments along the second axis of the main plane of the bearing structure. The bearing structure segments are arranged symmetrically along the second axis of the main plane of the bearing structure in respect of the centre of movement. The symmetry of the arrangement of the bearing structure segments in respect of the centre of movement is also maintained during positioning movements of the bearing structure segments along the second axis of the main plane of the bearing structure, because the bearing structure segment or segments on one side of the centre of movement and the bearing structure segment or segments on the other side of the centre of movement perform with one another synchronous and opposite positioning movements along the second axis of the main plane of the bearing structure.

For optimizing load transfer into the guide device of the handling device, multi-segment arrangements having a centre of movement for the associated bearing structure segments with a central arrangement of the centre of movement may be mounted on the guide device and/or guided positionably along the first axis of the main plane of the bearing structure by the guide device with a central arrangement of the centre of movement.

A configuration, adapted to different cases of use, of the retaining element field formed by the retaining elements of the bearing structure segments is particularly possible when the bearing structure segments of at least one multi-segment arrangement are arranged next to one another in a row along the second axis of the main plane of the bearing structure and/or when the bearing structure segments of different rows of bearing structure segments are arranged in columns.

The handling device may have a particularly high flexibility regarding the configuration of the retaining element field formed by the retaining elements of the individual bearing structure segments. The bearing structure segments of this configuration can be brought close to one another such that projections provided on one side on mutually adjacent bearing structure segments and having at least one retaining element engage in recesses provided on the other side. When the retaining elements are arranged appropriately on the relevant bearing structure segments, retaining elements on the projection or projections of a bearing structure segment and retaining elements in a region, delimiting the recess or recesses, of an adjacent bearing structure segment can even pass one another in the respective direction of movement during relative positioning movements of the bearing structure segments. The outlines of mutually adjacent bearing structure segments can be configured in a complementary manner such that when the bearing structure segments have approached one another, the bearing structure segments are interlocked.

DETAILED DESCRIPTION

A device 1, illustrated in the figures, for handling workpieces is provided as an automation component for a machine tool configured as a punching machine 2. Metal sheets which are not shown for the sake of simplicity are punch-cut on the punching machine 2. The device 1 serves to feed the punching machine 2 with workpieces in the form of unmachined raw sheets for machining and to remove workpieces produced as machined products from the vicinity of the punching machine 2.

Figure 3:
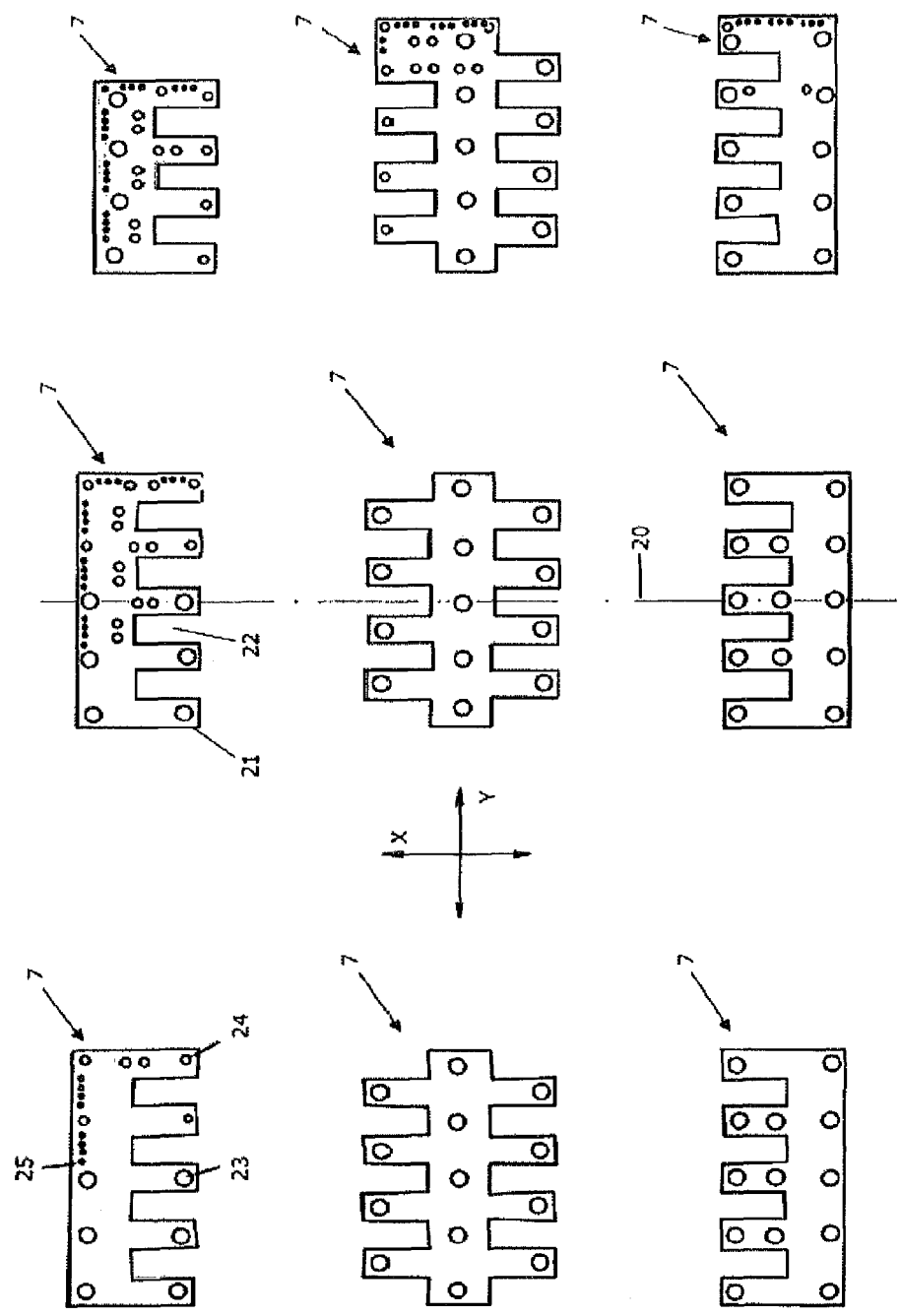
FIG. 3 is a workpiece-side view of the bearing structure segments of the bearing structure according to FIGS. 1 and 2, FIGS. 4 and 5 show the device of FIGS. 1 to 3 in a second operational state.
Figure 6:
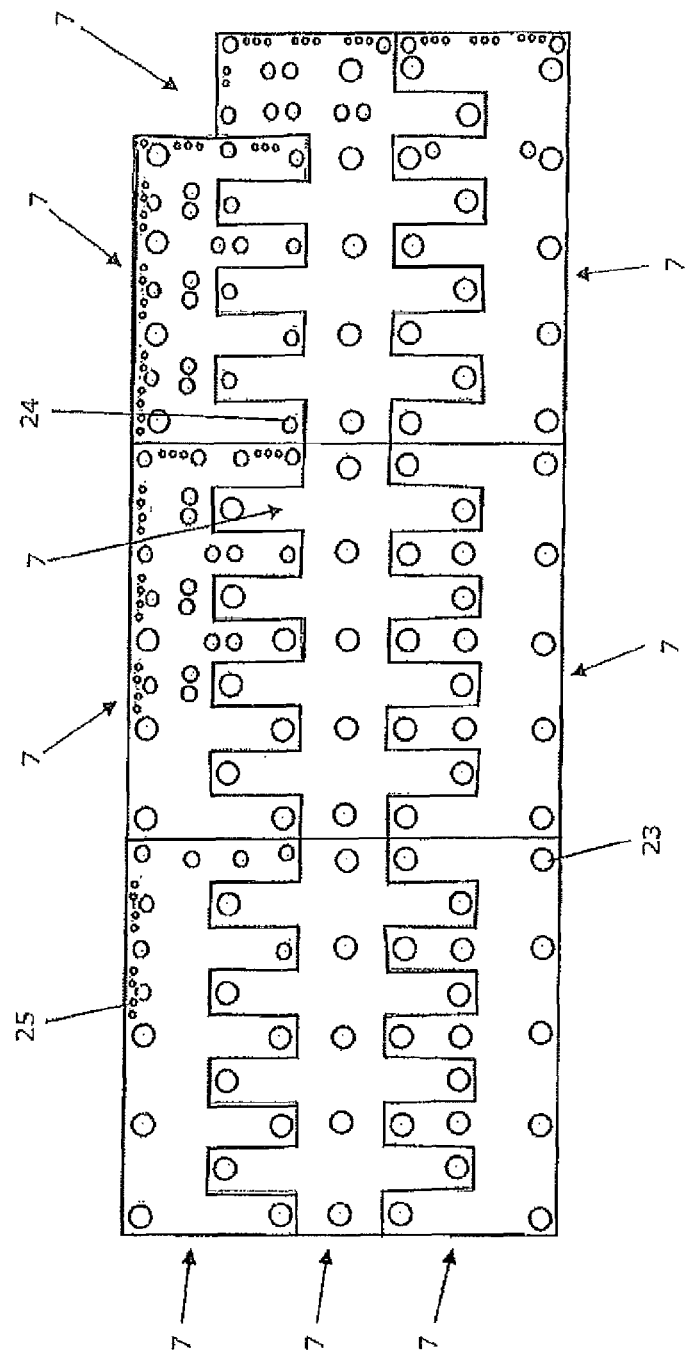
FIG. 6 is a workpiece-side view of the bearing structure segments of the bearing structure according to FIGS. 4 and 5.

The device 1 is connected in a conventional manner by an assembly frame 3 to a movement unit which is not shown and can move horizontally together with the device 1 along a linear guide path of a guide frame in the direction of a double arrow 4. The device 1 can be raised and lowered vertically with respect to the movement unit in the direction of a double arrow 5. In this way, prior to the workpiece machining, the device 1 can receive raw sheets from a raw sheet pallet, acting as a workpiece support, and can transfer them for machining onto a machine table (not shown) of the punching machine 2. After the workpieces have been machined, the device 1 can receive the sheet metal parts, present as machined products, on the table of the punching machine 2 and can transport them to a workpiece support, for example to a finished part pallet or to a sheet skeleton pallet, arranged remote from the punching machine 2. To fix the workpieces to be transported, the device 1 has a bearing structure 6 including a plurality of plate-shaped bearing structure segments. The bearing structure segments are configured as suction plates 7 and as such are provided on the workpiece side with retaining elements in the form of conventional suckers 23, 24, 25. In FIGS. 3 and 6, the suckers 23, 24, 25 can be seen on the suction plates 7 in the workpiece-side view of the bearing structure 6.

In the present case, suckers 23, 24, 25 of three different sizes are used. The distribution of the suckers 23, 24, 25 over the suction plates 7 is variable. Consequently, the same applies to the shape of the suction fields of the individual suction plates 7 and thus to the shape of the entire suction field of the bearing structure 6.

In the illustrated example, the bearing structure 6 includes a total of nine suction pates 7 which lie next to one another parallel to the horizontal main plane of the bearing structure 6 and they determine the planar extent of the bearing structure 6 in the main plane thereof. Three suction plates 7 each form a segment arrangement or suction plate arrangement 8/1, 8/2, 8/3 configured as a multi-segment arrangement. The suction plate arrangements 8/1, 8/2, 8/3 can be positioned relative to one another along a first axis (X axis) spanning the main plane of the bearing structure 6. For this purpose, the suction plate arrangements 8/1, 8/2 are mounted movably along the X axis on a guide frame 9 connected to the assembly frame 3. The suction plate arrangement 8/3 is mounted on the guide frame 9 such that it is stationary in the X direction.

The suction plates 7 of each suction plate arrangement 8/1, 8/2, 8/3 can be positioned relative to one another along a second axis (Y axis) spanning the main plane of the bearing structure 6. In this respect, the outer suction plates 7 in each case of each of the suction plate arrangements 8/1, 8/2, 8/3 are attached to a telescopic rail 10 which, for its part, can move with two partial rails along the Y axis out of a carrier 11, extending in the Y direction, or can move into the carrier 11. The middle suction plates 7 of the suction plate arrangements 8/1, 8/2, 8/3 are mounted in a stationary manner on the carriers 11 in the direction of the Y axis.

The carriers 11 of the suction plate arrangements 8/1, 8/2 are guided movably along the X axis on the guide frame 9. All the carriers 11 guide the telescopic rails 10, moving into and out of the carriers 11, of the suction plate arrangements 8/1, 8/2, 8/3 along the Y axis.

Accordingly, the carriers 11 form the Y guidance of a guide device 12 for guiding the suction plates 7 parallel to the main plane of the bearing structure 6. The guide frame 9 on which the carriers 11 can move with the suction plate arrangements 8/1, 8/2 along the X axis is used as the X guidance of the guide device 12.

To produce relative positioning movements of the suction plate arrangements 8/1, 8/2, 8/3 along the X axis, two conventional type linear motors are used which are concealed in the figures and one of which respectively drives the carrier 11 of suction plate arrangement 8/1 as well as the carrier 11 of suction plate arrangement 8/2 in a controlled manner along the X axis.

Relative positioning movements of the suction plates 7 of the different suction plate arrangements 8/1, 8/2, 8/3 along the Y axis are performed by a drive motor 13 common to all suction plates 7 movable in the Y direction.

In the present example, drive motor 13 is configured as an electric drive motor and is mounted in a stationary manner on the guide frame 9 of the device 1. Instead of the electric drive motor 13, in particular a pneumatic or hydraulic servo motor would also be possible.

Figure 1:
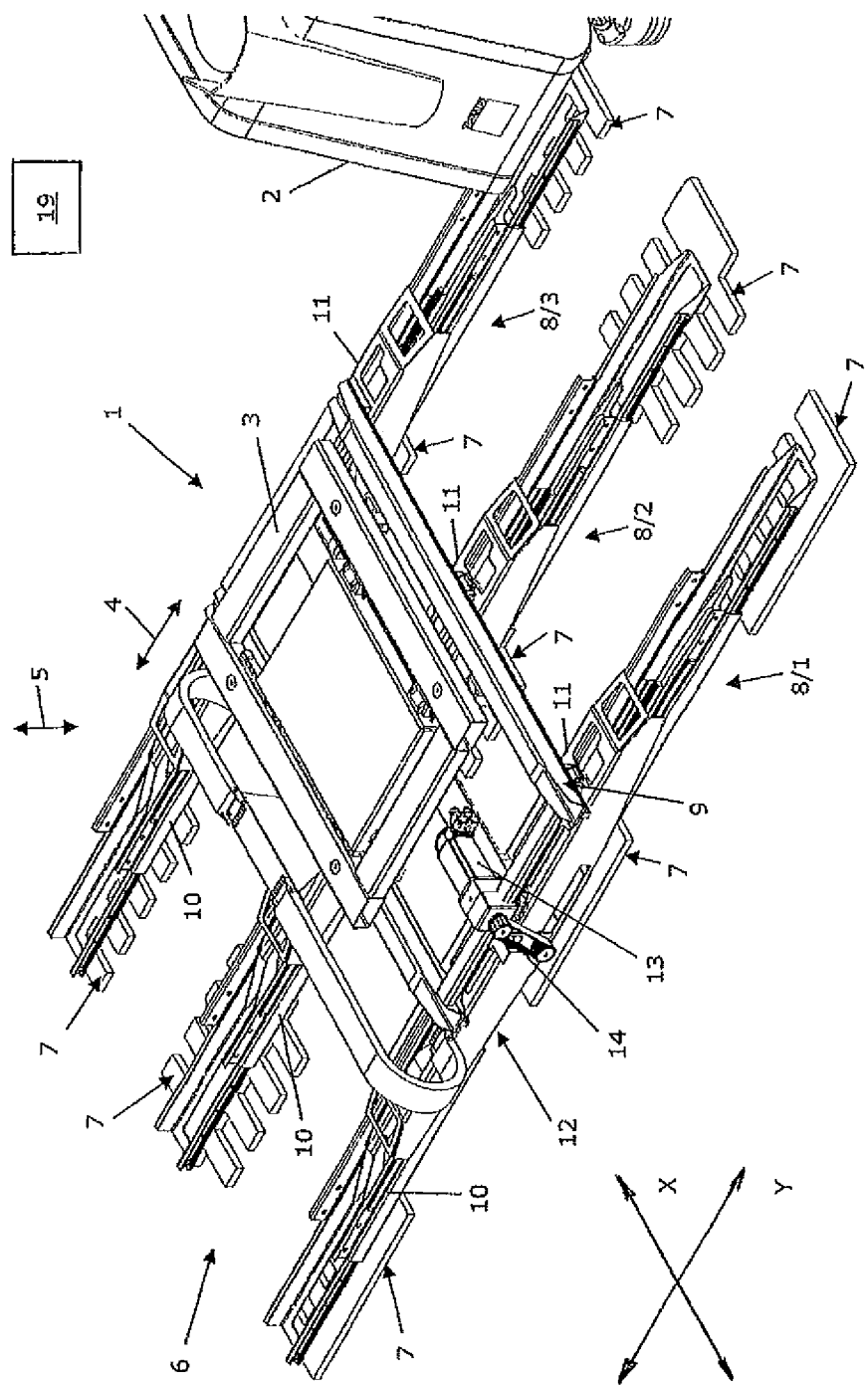
FIG. 1 is a perspective view of a device for handling workpieces comprising a bearing structure having bearing structure segments, in a first operational state.
Figure 7:
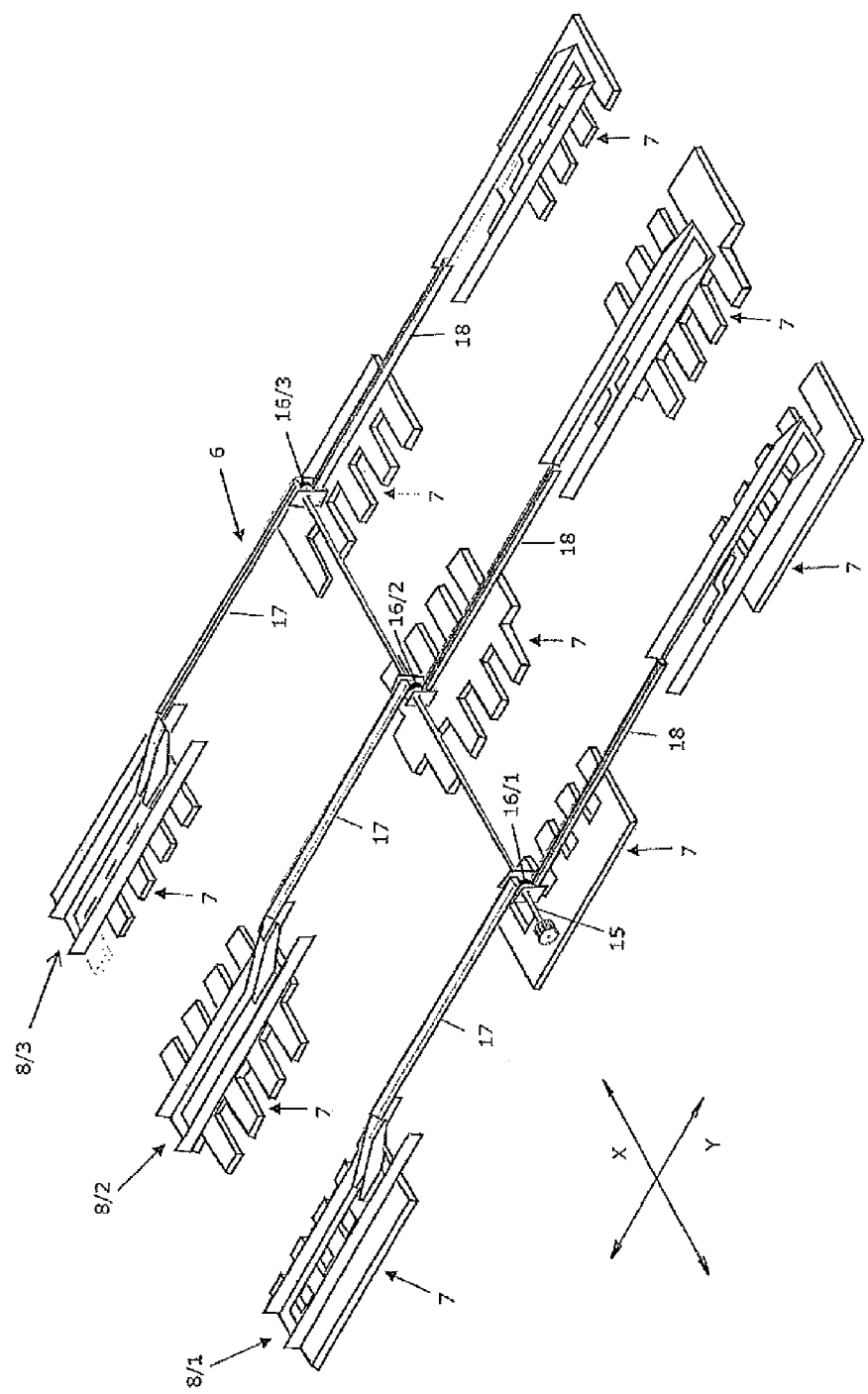
FIG. 7 shows a detail of a drive for the bearing structure segments according to FIGS. 1 to 6.

The drive motor 13 employs a toothed belt 14 to drive a polygonal shaft 15 that is concealed in FIG. 1 under the guide frame 9 and extends along the X axis. The polygonal shaft 15 can be seen in detail in FIG. 7. The polygonal shaft 15 is employed as a common drive shaft for all suction plates 7 of the bearing structure 6 movable in the Y direction. Together with the common drive motor 13, the common polygonal shaft 15 forms a common segment positioning drive of the suction plates 7 movable along the Y axis.

Positioned on the polygonal shaft 15 are driving pinions 16/1, 16/2, 16/3 which, for their part, are mounted on the carriers 11 of the suction plate arrangements 8/1, 8/2, 8/3 such that they can rotate about the geometric axis of the polygonal shaft 15. The hubs of the driving pinions 16/1, 16/2, 16/3 have a polygonal cross section which corresponds to the cross-sectional shape of the polygonal shaft 15. The driving pinion 16/1 of suction plate arrangement 8/1 and the driving pinion 16/2 of suction plate arrangement 8/2 can be displaced relative to the polygonal shaft 15 in the longitudinal direction of the polygonal shaft 15, i.e., along the X axis. Each of the driving pinions 16/1, 16/2, 16/3 meshes with two racks 17, 18 which, for their part, are connected to the two partial rails of the respective telescopic rail 10. The driving pinions 16/1, 16/2, 16/3 form together with the racks 17, 18, meshing therewith, a toothed gearing between the polygonal shaft 15 and the suction plates 7 movable in the Y direction.

A rotation of the polygonal shaft 15 with the driving pinions 16/1, 16/2, 16/3 about its geometric axis produces opposite movements of the racks 17, 18 and thereby opposite movements of the outer suction plates 7, connected to the racks 17, 18, of each suction plate arrangement 8/1, 8/2, 8/3 along the Y axis.

A drive for the movement of the suction plate arrangements 8/1, 8/2, in the X direction which corresponds to the drive for the suction plate movement in the Y direction, is possible instead of the linear drive illustrated here.

The control of the drive motor 13 for the mutual positioning of the suction plates 7 along the Y axis as well as the control of the linear motors for the mutual positioning of the suction plate arrangements 8/1, 8/2, 8/3 along the X axis is integrated into a numerical control system 19, indicated in FIG. 1, of a mechanical arrangement including the device 1 and the punching machine 2.

The bearing structure 6 of the device 1 for handling workpieces is configured subject to the respective handling task by a mutual positioning of the suction plates 7.

Figure 2:
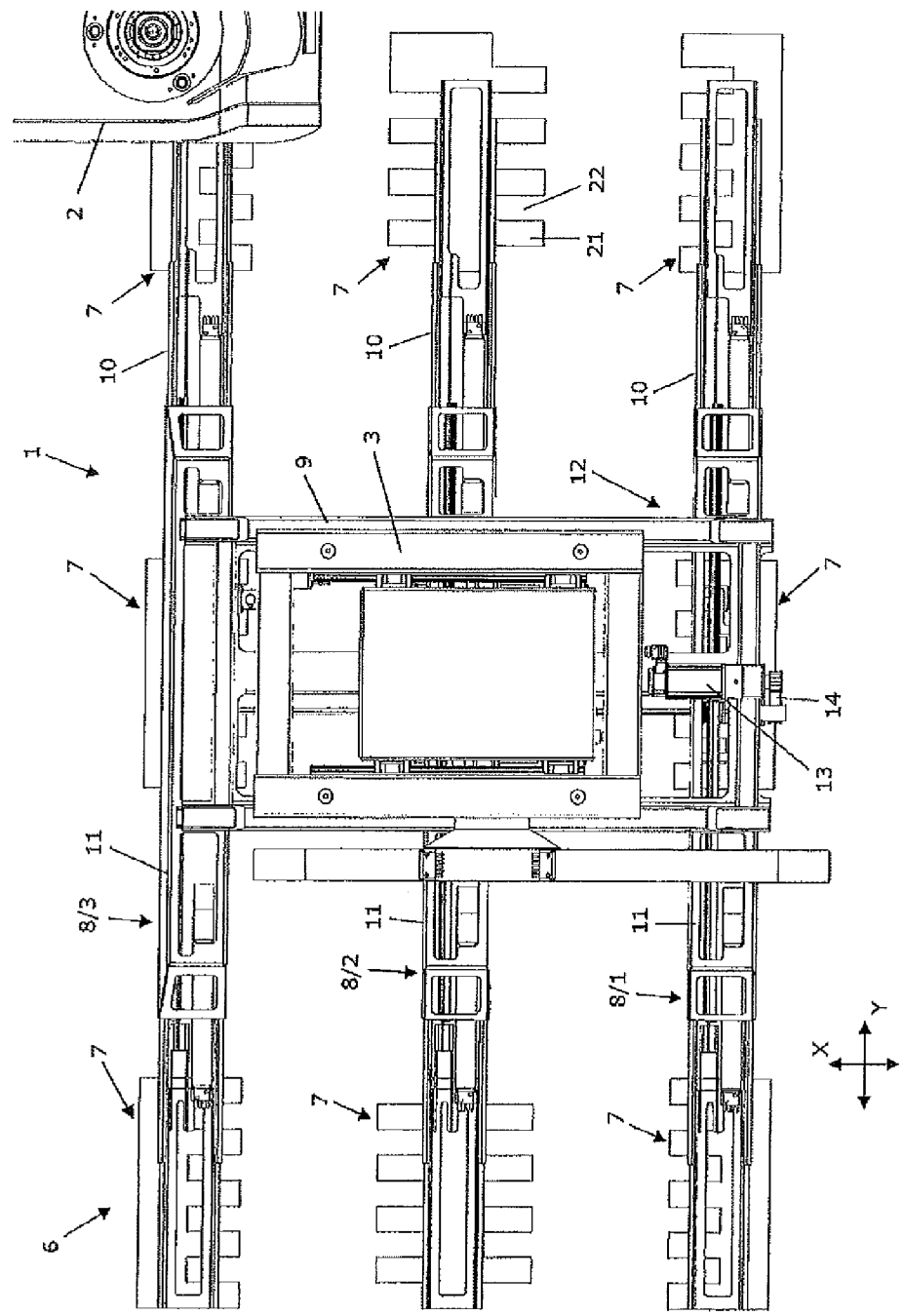
FIG. 2 is a plan view of the device according to FIG. 1.

In FIGS. 1 to 3, the bearing structure 6 is in an operating state in which it is capable of handling large sheets, particularly sheets of a 1.5 metre×3 metre format. Due to a corresponding mutual positioning of the suction plate arrangements 8/1, 8/2, 8/3 along the X axis and of the suction plates 7 of the individual suction plate arrangements 8/1, 8/2, 8/3 along the Y axis, the bearing structure 6 has its maximum planar extent which substantially corresponds to the dimensions of the large sheet to be handled. In the operating state according to FIGS. 1 to 3, the bearing structure 6 can be used in particular for loading the punching machine 2 with raw sheets to be machined. As can also be seen in FIG. 3, in the illustrated operating state, the suction plates 7 of the bearing structure 6 are arranged in three rows, spaced apart from one another along the X axis, with respectively three suction plates 7, and are arranged in three columns, spaced apart from one another along the Y axis, with respectively three suction plates 7.

Figure 4:
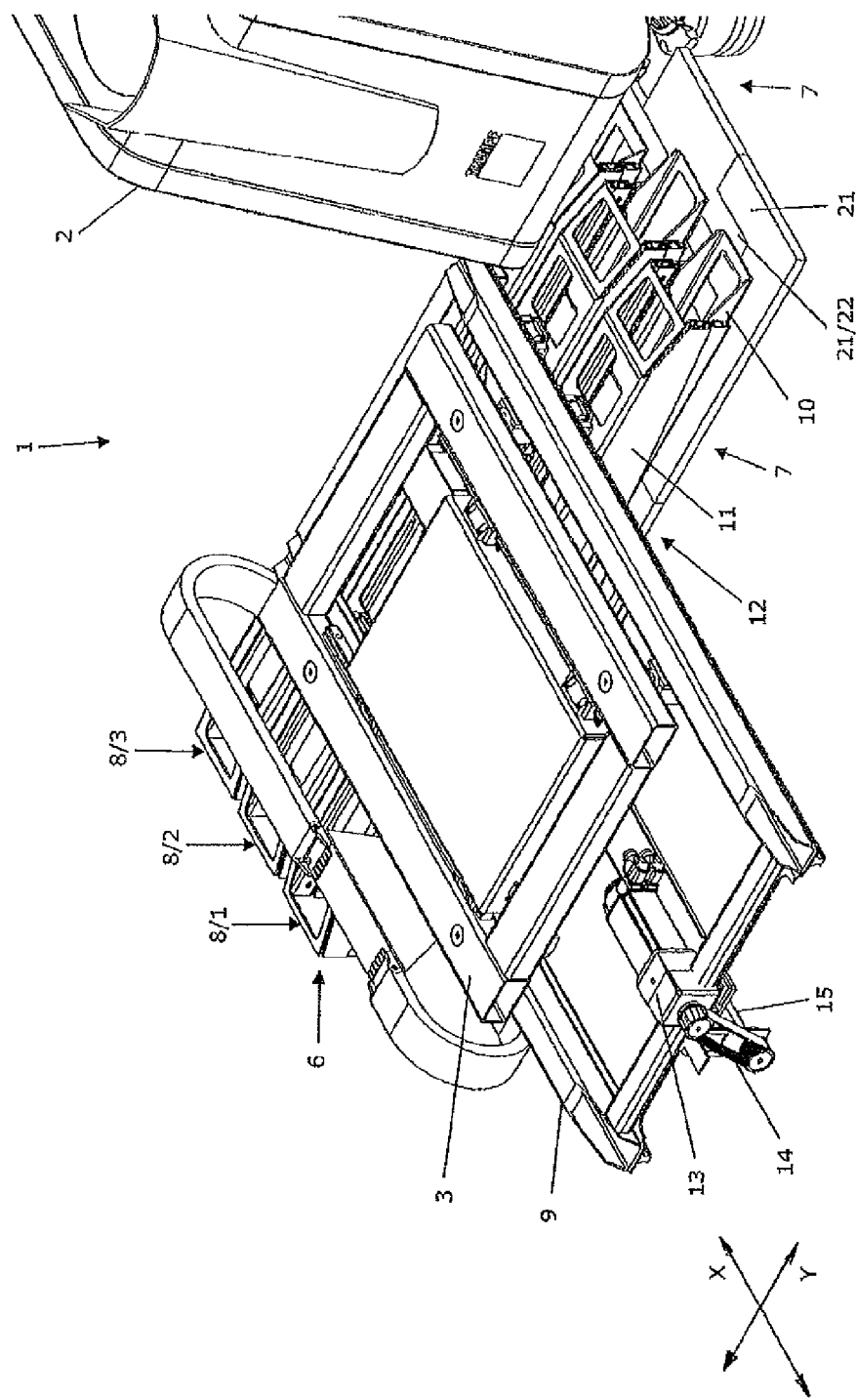
Figure 5:
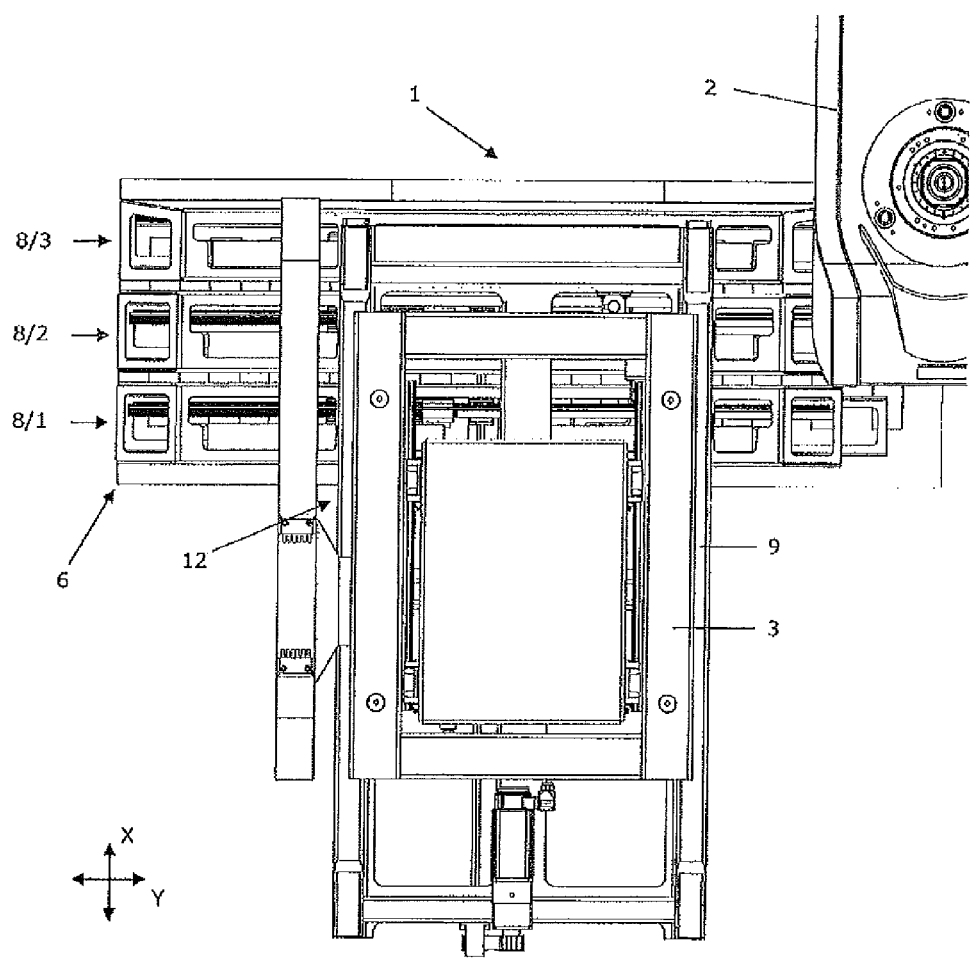

The other extreme case of the planar extent of the bearing structure 6 is illustrated in FIGS. 4 to 6.

Starting from the conditions according to FIGS. 1 to 3, the linear motors of suction plate arrangements 8/1, 8/2 as well as the common drive motor 13 of the suction plates 7, movable in the Y direction, of the suction plate arrangements 8/1, 8/2, 8/3 have been actuated in a controlled manner. As a result of the motor actuation, on the one hand the movable suction plate arrangements 8/1, 8/2 have been moved towards the stationary suction plate arrangement 8/3. On the other hand, the outer suction plates 7 of the suction plate arrangements 8/1, 8/2, 8/3 have been moved in the opposite direction to the middle suction plates 7, mounted in a fixed manner on the carriers 11. During the opposite movements performed by the outer suction plates 7, the symmetry of the suction plate arrangements 8/1, 8/2, 8/3 with respect to a centre axis 20 indicated in FIG. 3, has been retained. Consequently, the symmetrical load transfer, already realized in the operating state according to FIGS. 1 to 3, into the guide frame 9 has also not been impaired due to the opposite movements of the outer suction plates 7 of the suction plate arrangements 8/1, 8/2, 8/3.

In FIGS. 4 to 6, the planar extent of the bearing structure 6 is minimal. In this operating state, the bearing structure 6 is capable, for example, of gaining access to the spatially constricted region of the punching head of the punching machine 2. In the operating state according to FIGS. 4 to 6, the bearing structure 6 is particularly capable of receiving machined products, produced at the punching machine 2, directly at the production site thereof.

As can be seen in particular from FIG. 6, mutually adjacent suction plates 7 of the correspondingly configured bearing structure 6 engage in one another with projections 21 provided on one side and recesses 22 provided on the other. Accordingly, mutually adjacent suction plates 7 are interlocked. On the way into the position according to FIG. 6, suckers 23, 24, 25, arranged on projections 21 of mutually adjacent suction plates 7, pass one another along the X axis. Due to the interlocking facility of the suction plates 7, the suckers 23, 24, 25 of the bearing structure 6 can be arranged particularly flexibly relative to one another.

Intermediate positions between the extreme position assumed by the suction plates 7 in FIGS. 1 to 3 on the one hand and the extreme position assumed in FIGS. 4 to 6 on the other are possible. In particular, it is possible to position the suction plate arrangements 8/1, 8/2, 8/3 relative to one another along the X axis, without the suction plates 7 of the individual suction plate arrangements 8/1, 8/2, 8/3 also performing a mutual positioning movement along the Y axis. Furthermore, the suction plates 7 of the individual suction plate arrangements 8/1, 8/2, 8/3 can be positioned relative to one another along the Y axis without the suction plate arrangements 8/1, 8/2, 8/3 also having to perform a mutual positioning movement along the X axis.

Figure 8:
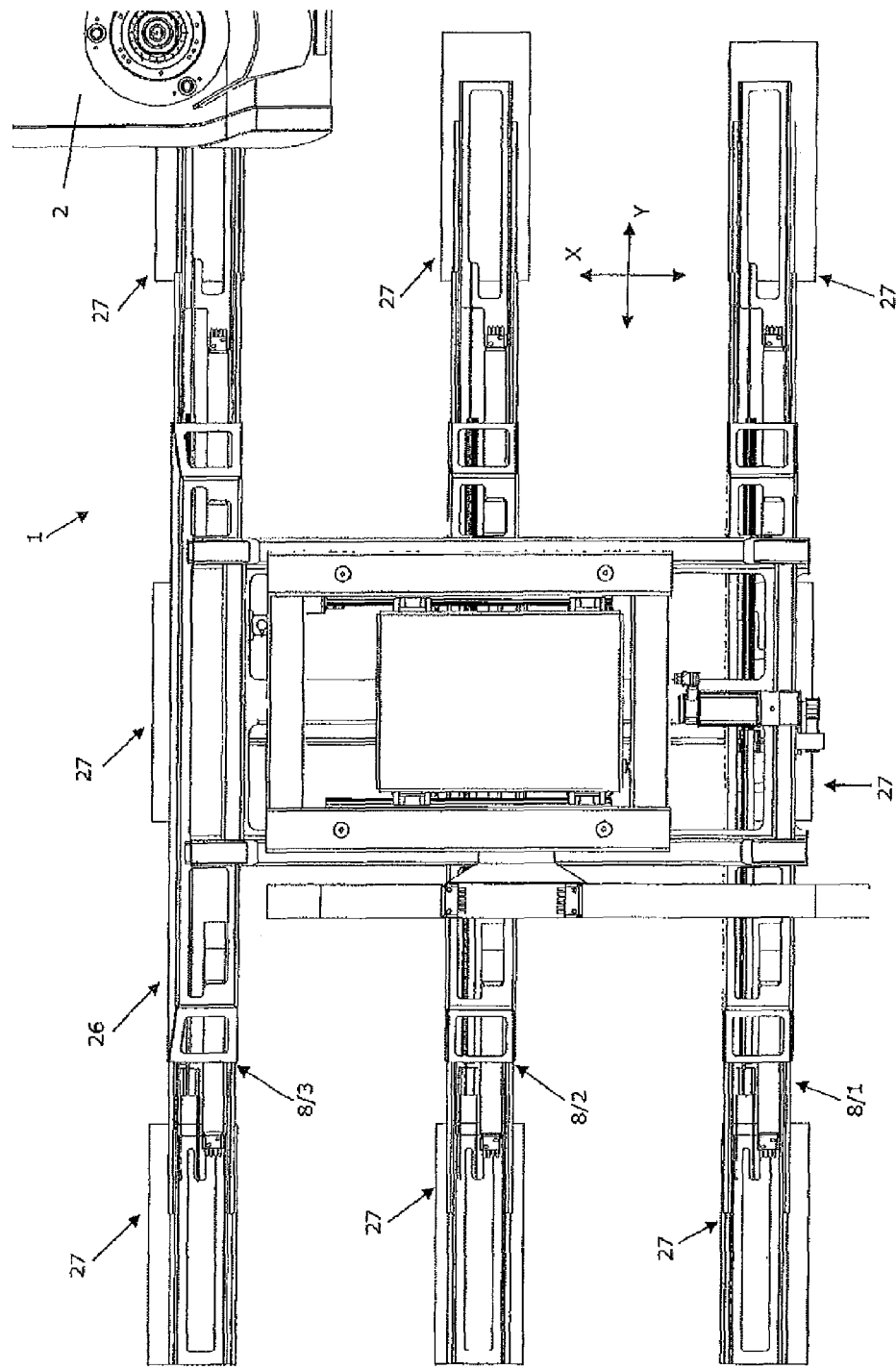
FIG. 8 shows a device for handling workpieces comprising a bearing structure configured differently to that of FIGS. 1 to 7.

A bearing structure 26 shown in FIG. 8 only differs from the bearing structure 6 according to FIGS. 1 to 7 by the outlines of suction plates 27 provided as bearing structure segments. Unlike the suction plates 7 according to FIGS. 1 to 7, the suction plates 27 according to FIG. 8 have straight longitudinal and transverse boundaries without projections 21 and recesses 22.

A number of embodiments of the invention have been described. Nevertheless, it will be understood that various modifications may be made without departing from the spirit and scope of the invention. Accordingly, other embodiments are within the scope of the following claims.

What is claimed is:

1. A workpiece handling device comprising:
    a bearing structure defining a main bearing structure plane parallel to a workpiece support plane defined by a workpiece support, the bearing structure having bearing structure segments arranged next to one another parallel to the main bearing structure plane, with the bearing structure segments defining a planar extent of the bearing structure in the main bearing structure plane;
    a bearing structure segment guide configured to guide the bearing structure segments such that the bearing structure segments are positionable parallel to the main bearing structure plane; and
    retaining elements associated with the bearing structure segments and configured to be manipulated to fix a workpiece to be handled,
    wherein the bearing structure segments and their associated retaining elements form at least two segment arrangements positionable relative to one another on the guide so as to change the planar extent of the bearing structure along a first axis spanning the main bearing structure plane,
    wherein at least one of the segment arrangements is configured as a multi-segment arrangement having at least two bearing structure segments arranged adjacent one another along a second axis spanning the main bearing structure plane and extending perpendicularly to the first axis, and
    wherein bearing structure segments of at least one multi-segment arrangement are positionable relative to one another by operation of a motor so as to change the planar extent of the bearing structure along the second axis.

2. The device of claim 1, wherein the multi-segment arrangement and at least one further segment arrangement are positionable relative to one another by operation of a motor along the first axis of the main bearing structure plane, and wherein the multi-segment arrangement and the at least one further segment arrangement are configured to be moved by a common arrangement positioning drive along the first axis.

3. The device of claim 2, wherein the common arrangement positioning drive is connected to at least one of the multi-segment arrangement or the at least one further segment arrangement by a toothed gearing.

4. The device of claim 3, wherein the toothed gearing comprises a driving pinion driven by a common drive motor of the common arrangement positioning drive, and racks controllably positionable by the driving pinion and connected to the at least one of the multi-segment arrangement or the at least one further segment arrangement.

5. The device of claim 1, wherein at least two bearing structure segments of at least one multi-segment arrangement of the segment arrangements are positioned relative to one another along the second axis of the main bearing structure plane, the at least two bearing structure segments configured to be moved by a common segment positioning drive along the second axis.

6. The device of claim 5, wherein the common segment positioning drive is connected by a toothed gearing to the at least two bearing structure segments, and wherein the toothed gearing comprises a driving pinion driven by a common drive motor of the common segment positioning drive and racks controllably positionable by the driving pinion and connected to the at least two bearing structure segments.

7. The device of claim 6, wherein the common segment positioning drive includes a common drive shaft extending along the first axis of the main bearing structure plane and drivable by the common drive motor,
wherein the toothed gearing includes a plurality of driving pinions on the common drive shaft, each driving pinion connected to a respective multi-segment arrangement, and
wherein the driving pinions are configured to be positioned relative to one another, controlled by a first motor, along the first axis of the main bearing structure plane.

8. The device of claim 7, wherein the driving pinions mesh with racks positionable relative to one another, controlled by the first motor, along the first axis of the main bearing structure plane,
wherein each of the racks is connected to a respective bearing structure segment, and
wherein, by operation of a second motor, the racks together with the bearing structure segments connected thereto are positionable relative to one another along the second axis of the main bearing structure plane.

9. The device of claim 1, wherein one of the segment arrangements positionable relative to one another along the first axis is stationary in a direction of a relative positioning movement of the segment arrangements performed along the first axis.

10. The device of claim 1, wherein one bearing structure segment of the at least one multi-segment arrangement is stationary in a direction of a relative positioning movement of the bearing structure segments performed along the second axis.

11. The device of claim 10, wherein the at least one multi-segment arrangement comprises an odd number of bearing structure segments, including a middle bearing structure segment as the bearing structure segment which is stationary in the direction of movement.

12. The device of claim 1, wherein the at least one multi-segment arrangement has a center of movement for the bearing structure segments along the second axis of the main bearing structure plane, about which center of movement the bearing structure segments are arranged symmetrically along the second axis, and
wherein the bearing structure segment or segments on one side of the center of movement and the bearing structure segment or segments on the other side of the center of movement are controllably and synchronously positionable relative to one another in opposite directions of movement along the second axis.

13. The device of claim 12, wherein the multi-segment arrangement is mounted on the guide with a central arrangement of the center of movement and guided by the guide along the first axis of the main bearing structure plane.

14. The device of claim 1, wherein the bearing structure segments of the at least one multi-segment arrangement are arranged in a row next to one another along the second axis of the main bearing structure plane.

15. The device of claim 1, wherein a plurality of multi-segment arrangements follow one another in rows along the first axis,
wherein respective bearing structure segments of each of the plurality of multi-segment arrangements are arranged next to one another in a row along the second axis of the main bearing structure plane, and
wherein the bearing structure segments of the different multi-segment arrangements are arranged in columns along the first axis of the main bearing structure plane.

16. The device of claim 1, wherein mutually adjacent bearing structure segments have outlines defining projections and recesses in a vertical projection onto the main bearing structure plane, and
wherein the projections and recesses are configured in a complementary manner to one another, such that the adjacent bearing structure segments are movable relative to one another into positions in which projections of one segment are selectively received within, or spaced from, recesses of another segment.

17. A system comprising:
a workpiece machine tool for machining workpieces; and
a workpiece handling device for handling the workpieces for the workpiece machine tool, the workpiece handling device comprising:
a bearing structure defining a main bearing structure plane parallel to a workpiece support plane defined by a workpiece support, the bearing structure having bearing structure segments arranged next to one another parallel to the main bearing structure plane, with the bearing structure segments defining a planar extent of the bearing structure in the main bearing structure plane;
a bearing structure segment guide configured to guide the bearing structure segments such that the bearing structure segments are positionable parallel to the main bearing structure plane; and
retaining elements associated with the bearing structure segments and configured to be manipulated to fix a workpiece to be handled,
wherein the bearing structure segments and their associated retaining elements form at least two segment arrangements positionable relative to one another on the guide so as to change the planar extent of the bearing structure along a first axis spanning the main bearing structure plane,
wherein at least one of the segment arrangements is configured as a multi-segment arrangement having at least two bearing structure segments arranged adjacent one another along a second axis spanning the main bearing structure plane and extending perpendicularly to the first axis, and
wherein bearing structure segments of at least one multi-segment arrangement are positionable relative to one another by operation of a motor so as to change the planar extent of the bearing structure along the second axis.

18. The system of claim 17, further comprising a numerical control system for controlling the workpiece machine tool and the workpiece handling device.

\* \* \* \* \*